United States Patent
Hao et al.

(10) Patent No.: US 11,970,246 B2
(45) Date of Patent: Apr. 30, 2024

(54) SHIP CABIN LOADING CAPACITY MEASURING METHOD AND APPARATUS THEREOF

(71) Applicant: Zhoushan Institute of Calibration and Testing for Quality and Technology Supervision, Zhoushan (CN)

(72) Inventors: Huadong Hao, Zhoushan (CN); Cunjun Li, Zhoushan (CN); Xianlei Chen, Zhoushan (CN); Haolei Shi, Zhoushan (CN); Ze'nan Wu, Zhoushan (CN); Junxue Chen, Zhoushan (CN); Zhengqian Shen, Zhoushan (CN); Yingying Wang, Zhoushan (CN); Huizhong Xu, Zhoushan (CN)

(73) Assignee: Zhoushan Institute of Calibration and Testing for Quality and Technology Supervision, Zhoushan (CN)

( * ) Notice: Subject to any disclaimer, the term of this patent is extended or adjusted under 35 U.S.C. 154(b) by 259 days.

(21) Appl. No.: 17/168,243

(22) Filed: Feb. 5, 2021

(65) Prior Publication Data

US 2022/0081075 A1    Mar. 17, 2022

(30) Foreign Application Priority Data

Sep. 11, 2020    (CN) .......................... 202010954564.4

(51) Int. Cl.
*B63B 25/00*    (2006.01)
*B63B 27/30*    (2006.01)
(Continued)

(52) U.S. Cl.
CPC ............ *B63B 25/002* (2013.01); *B63B 27/30* (2013.01); *G01F 17/00* (2013.01); *G06V 20/59* (2022.01)

(58) Field of Classification Search
CPC ....... B63B 25/002; B63B 25/08; B63B 27/30; B63B 79/20; G06T 3/4038; G06T 7/337; G06T 7/62; G06T 2207/1002; G06V 20/59
(Continued)

(56) References Cited

U.S. PATENT DOCUMENTS

| 2016/0343124 A1* | 11/2016 | Sundheimer ............ G01F 22/00 |
| 2019/0147245 A1* | 5/2019 | Qi .......................... G06V 10/82 |
| | | 382/103 |

(Continued)

FOREIGN PATENT DOCUMENTS

CN    110118526    *    8/2019    ............. G01B 11/00

OTHER PUBLICATIONS

CN 110118526—English Translation (Year: 2019).*
(Continued)

*Primary Examiner* — Mohamed Charioui
*Assistant Examiner* — Dacthang P Ngo

(57) ABSTRACT

A ship cabin loading capacity measurement method and apparatus thereof, comprises: acquiring point cloud measurement data of a ship cabin; optimizing the point cloud measurement data according to a predetermined point cloud data processing rule, and generating optimized ship cabin point cloud data; calculating said ship cabin point cloud data with a predetermined loading capacity calculation rule, and getting ship cabin loading capacity data. According to the ship cabin loading capacity measurement method of the present invention, the point cloud measurement data can be acquired by a lidar, and processing the point cloud measurement data of the ship cabin with a predetermined point cloud data processing law and a computation law, and as the point cloud data processing law and the computation law can be deployed in a computer device in advance, after point cloud (Continued)

measurement data acquisition, loading capacity of a ship cabin can be acquired quickly and precisely.

3 Claims, 4 Drawing Sheets

(51) Int. Cl.
  *G01F 17/00* (2006.01)
  *G06V 20/59* (2022.01)
(58) Field of Classification Search
  USPC .......................................................... 702/156
  See application file for complete search history.

(56) References Cited

U.S. PATENT DOCUMENTS

2020/0234491 A1* 7/2020 Pöyhtäri .............. G05D 1/0088
2021/0042929 A1* 2/2021 Zhao ........................ G06N 3/08

OTHER PUBLICATIONS

An Iterative Closet Points Algorithm for Registration of 3D Laser Scanner Point Clouds with Geometric Features (Year: 2017).*
Registration of 3D Point clouds for ship block measurement (Year: 2015).*
The automatic measurement system of large vertical storage tank volume based on 3D laser scanning principle (Year: 2019).*

* cited by examiner

SHIP CABIN LOADING CAPACITY MEASURING METHOD AND APPARATUS THEREOF

TECHNICAL FIELD

The present invention belongs to computer technology field, especially relates to a ship cabin loading capacity measuring method and apparatus thereof.

BACKGROUND TECHNOLOGY

Petrochemical products are important mainstay of Chinese domestic economy, and are keystone of national energy economy and energy strategy. Ship cabins are a kind of chief measuring apparatus in liquid cargo, oil products and chemical products transaction, and the easiest and cheapest way to conduct petrochemical product transaction and settlement is by ship trade. There are currently a large amount of transfer ships for liquid cargo transaction, which are used in energies such as oil, chemicals, natural gas liquid transfer and transportation, and measurement accuracy of liquid energy is directly connected with national economic benefits and international measurement credibility.

At present, internationally ship cabin capacity measurement is done in the following two ways capacity comparison test method and geometrical measurement method; by a capacity comparison test, water is used as a measuring medium, and a standard metallic gauge is used to express loading capacity, by measuring corresponding liquid level after filling water with a standard metallic gauge and the liquid surface becomes stable, repeating the foregoing steps until liquid level reaches the height of the measured ship cabin, and processing measurement data with special computer software, cabin loading capacity values of different liquid levels when the ship is in different longitudinal inclinations are measured. By applying geometrical measurement method, geometrical dimensions of a ship cabin are measured with steel tapes or theodolites, and measurement data are processed with special computer software to calculate cabin loading capacity values of different liquid levels when the ship is in different longitudinal inclinations. However, a lot of water is consumed in capacity comparison test method, which is also labor intensified, of long measurement duration and complicated measurement process; and automation level of geometrical measurement method is low, and processing efficiency thereof is not high too.

Therefore, there are technical deficiencies such as computation process too complex and computation efficiency not high enough existing with current ship cabin measurement method.

SUMMARY OF THE INVENTION

Purpose of the present invention is to provide a ship cabin loading capacity measurement method, targeting at technical problems existing in ship cabin capacity measurement method such as computation process very complex and computation efficiency low.

The following technical solution is used in the present invention, a ship cabin loading capacity measurement method, comprising:
Acquiring point cloud measurement data of a ship cabin;
Optimizing the point cloud measurement data according to a predetermined point cloud data processing rule, and generating optimized ship cabin point cloud data;
Calculating said ship cabin point cloud data with a predetermined loading capacity calculation rule, and getting ship cabin loading capacity data.

Another purpose of the present invention is to provide a ship cabin loading capacity measurement apparatus, comprising:
A point cloud measurement data acquisition unit for acquiring ship cabin point cloud measurement data;
A point cloud data optimization unit, for optimizing the point cloud measurement data according to a predetermined point cloud data processing rule, and generating optimized ship cabin point cloud data;
A ship cabin point cloud model calculation unit, for calculating the ship cabin point cloud data with a predetermined loading capacity calculation law and getting ship cabin loading capacity data.

A third purpose of the present invention is to provide a computer device, which comprises a storage device and a processor, wherein a computer program is stored in the storage device, and the computer program when executed by the processor will have the processor execute steps as mentioned in the ship cabin loading capacity measurement method.

A fourth purpose of the present invention is to provide a computer readable storage medium, wherein a computer program is stored and the computer program when executed by the processor will have the processor execute steps as mentioned in the ship cabin loading capacity measurement method.

According to the ship cabin loading capacity measurement method as provided in embodiments of the present invention, by acquiring point cloud measurement data of a ship cabin, wherein the point cloud measurement data can be acquired by a lidar, and processing the point cloud measurement data of the ship cabin with a predetermined point cloud data processing law and a computation law, and as the point cloud data processing law and the computation law can be deployed in a computer device in advance, after the point cloud measurement data acquisition, loading capacity of a ship cabin can be acquired quickly and precisely, and compared with existing capacity comparison method and geometrical measurement method, the process is simple and the measurement duration is short, with high efficiency and low expenses.

EMBODIMENTS

To illustrate purposes, technical solutions and advantages of the present invention more clearly, hereinafter, a further description will be given to the present invention by means of the accompanying drawings and embodiments. It shall be understood that all embodiments described herein are only for explaining the present invention, without limiting scope of the present invention.

It shall be understood that, the terms "first" and "second" are used in the present specification for describing all kinds of members, and unless stipulated otherwise, the members are not limited by these terms. These terms are only intended to differentiate a first member and a second member. For example, without departing from scope of the present invention, a first xx script can be named as a second xx script and similarly, a second xx script can be named as a first xx script.

Figure 1:
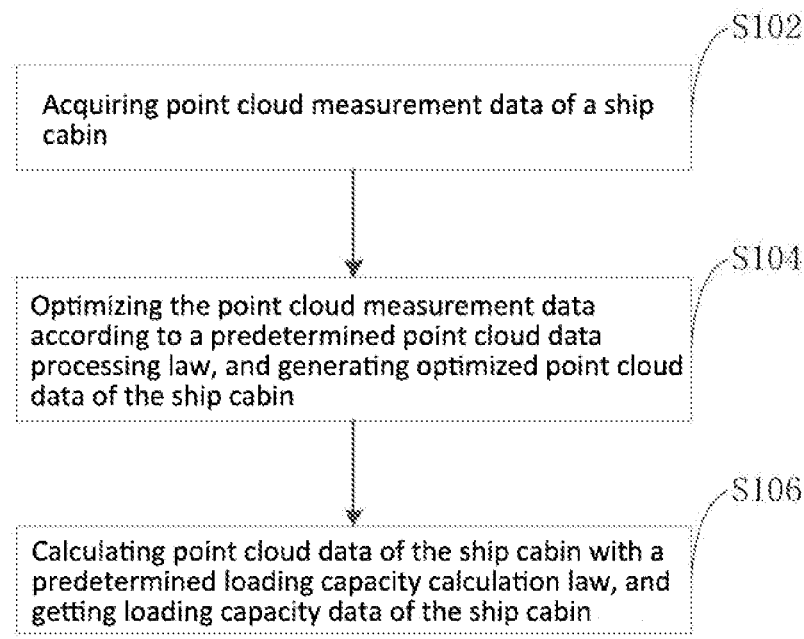
FIG. 1 is a procedural flowchart diagram of a ship cabin loading capacity measurement method according to an embodiment of the present invention.

As shown in FIG. 1, the present invention provides a procedural flowchart diagram of a ship cabin loading capacity measurement method, which comprises the following steps:

Step S102: acquiring point cloud measurement data of the ship cabin.

In an embodiment of the present invention, the point cloud measurement data can be acquired directly with three-dimensional lidar equipment, specifically, deploying the point cloud data processing rule and the loading capacity calculation rule in subsequent steps in a computer device as software, inputting the acquired point cloud measurement data of the ship cabin in the three-dimensional lidar equipment into the computer device by any feasible means such transmitting via a data cable, uploading, downloading or inputting manually etc., the point cloud data processing rule and the loading capacity calculation rule deployed in the computer device will process the point cloud measurement data of the ship cabin and generate the ship cabin loading capacity data.

Step S104: optimizing the point cloud measurement data according to predetermined point cloud data processing law, and generating optimized point cloud data of the ship cabin.

In an embodiment of the present invention, optimization of the point cloud measurement data of the ship cabin comprises data denoising and compression. Furthermore, as the ship is floating in water during use, actual loading capacity of the ship cabin will change as the ship inclines, consequently, it is usually necessary to modify the point cloud data of the ship cabin to incline longitudinally and transversely, and for specific point cloud data optimization steps FIG. 4 and description of FIG. 4 can be referred to.

Step S106, calculating the point cloud data of the ship cabin with the predetermined loading capacity calculation rule, and getting loading capacity data of the ship cabin.

Figure 7:
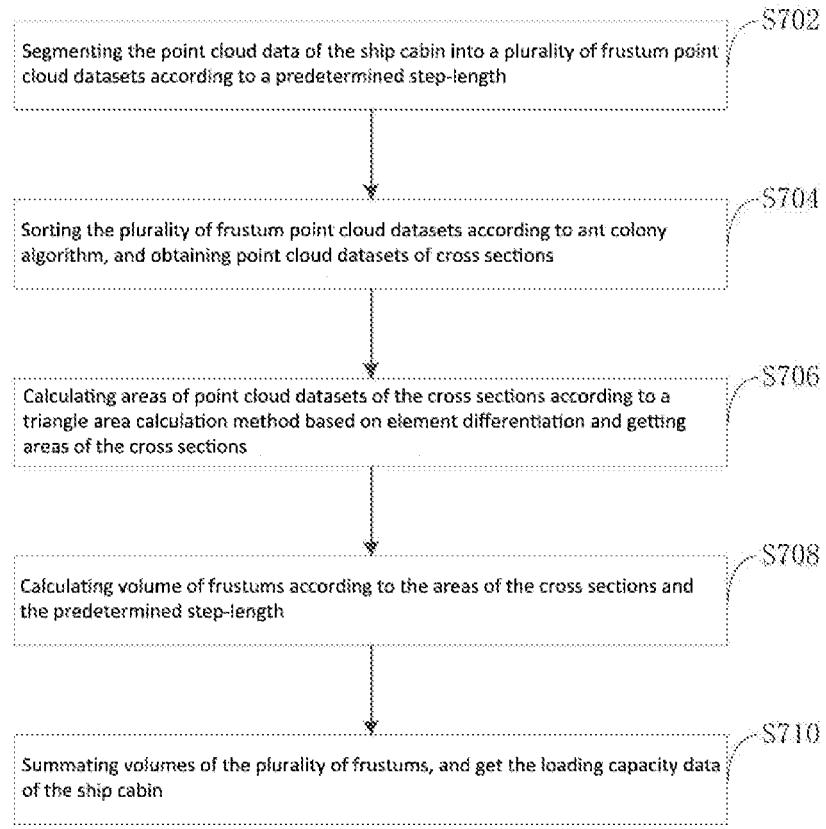
FIG. 7 is a procedural flowchart diagram of a ship cabin loading capacity measurement method according to an embodiment of the present invention.

In an embodiment of the present invention, point cloud data of the ship cabin is divided based on differential elements, calculating area of each cross section and integrate over height and loading capacity data of the ship cabin can be obtained, wherein, for specific activities FIG. 7 and an explanation on FIG. 7 can be referred to.

According to the ship cabin loading capacity measurement method as provided in embodiments of the present invention, by acquiring point cloud measurement data of a ship cabin, wherein the point cloud measurement data can be acquired by a lidar, and processing the point cloud measurement data of the ship cabin with a predetermined point cloud data processing law and a computation law, and as the point cloud data processing law and the computation law can be deployed in a computer device in advance, after the point cloud measurement data acquisition, loading capacity of a ship cabin can be acquired quickly and precisely, and compared with existing capacity comparison method and geometrical measurement method, the process is simple and the measurement duration is short, with high efficiency and low expenses.

Figure 2:
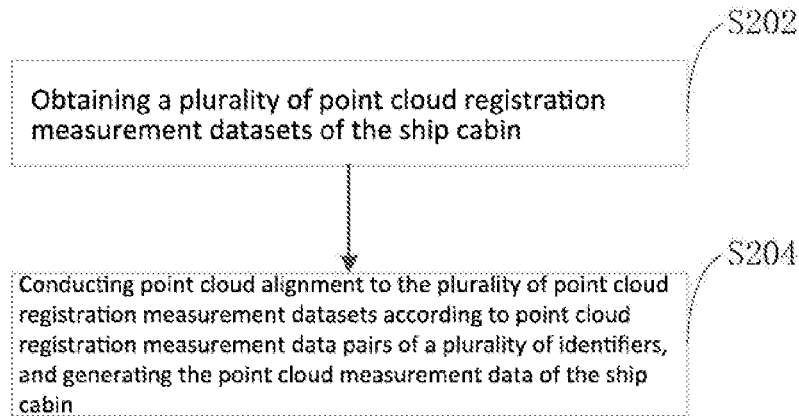
FIG. 2 is a procedural flowchart diagram of point cloud of a ship cabin measurement data acquisition according to an embodiment of the present invention.

As is shown in FIG. 2, a procedural flowchart diagram of a point cloud measurement data of the ship cabin acquisition method according to an embodiment of the present invention, comprises the following steps.

Step S202, obtaining multiple point cloud registration measurement datasets of the ship cabin.

In an embodiment of the present invention, given that parameters and shapes of ship cabins can be different, some ship cabins are of simple structure and dense and evenly distributed point cloud measurement data with less noise spots and of good quality can be got upon a scan of three-dimensional lidar equipment. However, structures of some ship cabins can be very complicated, with a lot of accessories such as longitudinal frames, transverse frames, ribs and spacers etc., which makes it impossible to generate point cloud measurement data of good quality upon one scan, therefore, the ship cabin is divided into several regions to make measurement, and several scans are done with the three-dimensional lidar equipment from a variety of perspectives and get several datasets for point cloud registration, concatenate multiple measurement datasets in a predetermined manner and get point cloud measurement data of the complete ship cabin. Specifically, the predetermined way to concatenate point clouds measurement data is iterative closest point (ICP) algorithm, wherein a variety of references are set in the ship cabin, to align point cloud registration measurement datasets by matching the variety of references.

As a preferred embodiment of the present invention, the references are set to be at least four, and not in a line.

Step S204, conduct point cloud alignment with the point cloud registration measurement datasets according to point cloud registration measurement datasets of the references, and generate point cloud measurement data of the ship cabin.

Figure 3:
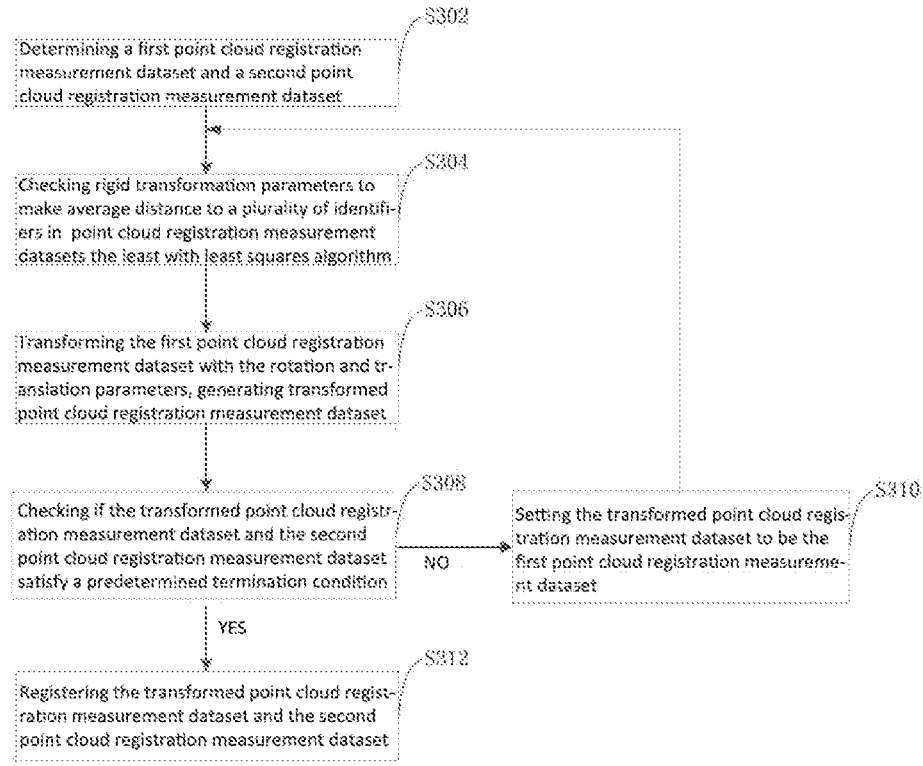
FIG. 3 is a procedural flowchart diagram of point clouds concatenating for generating point cloud measurement data of a ship cabin according to an embodiment of the present invention.

In an embodiment of the present invention, wherein, process of point cloud concatenation based on point cloud registration measurement datasets with the ICP algorithm can be seen in FIG. 3 and description of FIG. 3.

As is shown in FIG. 3, a procedural flowchart diagram of generating point cloud measurement data of the ship cabin based on point cloud concatenation according to an embodiment of the present invention, comprises following steps:

Step S302: determining a first point cloud registration measurement datasets and a second point cloud registration measurement datasets to be concatenated.

In an embodiment of the present invention, if there are more than one point cloud measurement dataset for concatenation, it is necessary to take one of the point cloud registration measurement datasets as reference, and match in turn each of the rest point cloud registration measurement datasets with the measurement dataset for point cloud registration, which is to say, registration of two or more point cloud registration measurement datasets is a process realized by matching two point cloud concatenated measurement datasets for multiple times.

In an embodiment of the present invention, concatenation of point cloud measurement datasets depends on point cloud measurement dataset alignment, that is to say, first it is necessary to align the point cloud registration measurement datasets, and matching the same, wherein, alignment of the point cloud measurement datasets for registration can be done after determining value of a identifier in different point cloud registration measurement dataset, wherein specific steps go as following.

Assume data corresponding to a identifier in the first point cloud registration measurement dataset and the second point cloud registration measurement dataset are $P_1(X, Y, Z)$ and $Q_1(X, Y, Z)$, core of alignment between the first point cloud registration measurement dataset and the second point cloud registration measurement dataset is to find a rotation matrix R and a translation matrix T, which satisfy:

$$\begin{pmatrix} X \\ Y \\ Z \end{pmatrix} = R \begin{pmatrix} x \\ y \\ z \end{pmatrix} + T$$

Wherein, R is an orthogonal matrix, $R^T=R^{-1}$, $|R|=\pm 1$, and the foregoing conditions shall be satisfied for any identifier, therefore, by choosing difference of an identifier after alignment as a object function, it can be known that the rotation matrix R and the translation matrix T shall satisfy:

$$\min_{R,t} J = \frac{1}{2} \sum_{i=1}^{n} \|P_i - (RQ_1 + T)\|^2$$

i=1, 2, ..., n, which corresponds to n reference points.

Step S304, determining rigid transformation parameters that can make average distance to an identifier in a point cloud registration measurement dataset the least according to least squares algorithm.

In an embodiment of the present invention, calculation process of R and T is:

First of all, calculate average values of each of the identifiers in the first point cloud registration measurement dataset and the second point cloud registration measurement dataset, that is, a central value P' and a central value Q', and get a matrix by, first, deducting the central value from the identifier in the first point cloud registration measurement dataset, second, getting a transposed matrix of the identifier in the second point cloud registration measurement dataset after deducting the central value, multiplying and summating the same, which is:

$$W = \sum_{i=1}^{n} (P_i - P')(Q_i - Q')^T$$

Calculate feature values and feature vectors of W by singular value decomposition, and $$W = U \Sigma V^T$$

Wherein, $\Sigma$ is a diagonal matrix consisted of feature values of W, and U and V are diagonal matrices, when W is nonsingular, rotation matrix $R=UV^T$, and translation matrix T can be got with the central value P' and Q' and the rotation matrix R, and the rotation matrix R and the translation matrix T are rigid transformation parameters satisfying $$\min_{R,t} J = \frac{1}{2} \sum_{i=1}^{n} \|P_i - (RQ_1 + T)\|^2.$$

Step S306, transforming the first point cloud registration measurement dataset with the rotation parameters and the translation parameters, and generating transformed point cloud registration measurement dataset.

In an embodiment of the present invention, transform the point cloud registration measurement datasets with the rotation parameters and translation parameters, transformed point cloud registration data can be obtained.

Step S308, checking whether the transformed point cloud registration measurement data and the second point cloud registration measurement dataset satisfy a predetermined termination condition. When it is judged that the predetermined termination condition is not satisfied, go to step S310; when it is judged that the predetermined termination condition is satisfied, go to step S312.

In an embodiment of the present invention, the predetermined termination condition can be iterative times, and it can also be whether difference between the transformed point cloud registration measurement data and a given identification point in the second point cloud registration measurement dataset is smaller than a threshold value, when the predetermined termination condition is not satisfied, it can be known that the process of finding the rotation parameters and the translation parameters is not concluded yet, and when the termination condition is satisfied, it can be known that the process of finding the rotation parameters and the translation parameters has been concluded.

Step S310, choosing the transformed point cloud registration measurement dataset as the first point cloud registration measurement dataset, and returning to step S304.

In an embodiment of the present invention, when the process of finding rotation parameters and translation parameters is not concluded yet, reset transformed point cloud registration measurement data as the first point cloud registration measurement dataset, iterate again according to step S304 again, and reduce difference from the corresponding identification point.

Step S314, concatenating the transformed point cloud registration measurement dataset and the second point cloud registration measurement dataset.

In an embodiment of the present invention, when the process of finding rotation parameters and translation parameters has already been concluded, difference from the corresponding identification point is small enough, concatenate the transformed point cloud registration measurement dataset with the second point cloud registration measurement dataset with the corresponding identification points.

Figure 4:
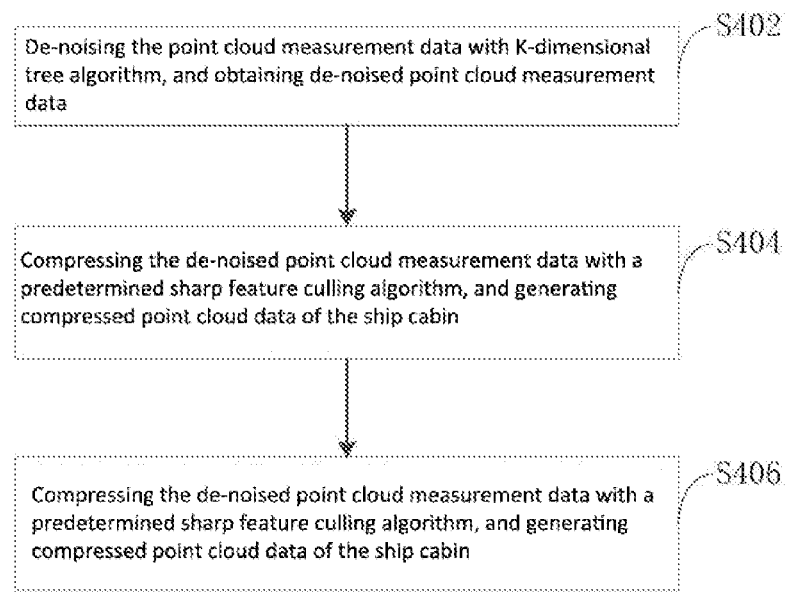
FIG. 4 is a procedural flowchart diagram of point cloud measurement data optimization process according to an embodiment of the present invention.

As is shown in FIG. 4, a procedural flowchart diagram of point cloud measurement data optimization according to an embodiment of the present invention, comprising the following steps:

Step S402, denoise the point cloud measurement data with K-dimensional tree algorithm, and obtain denoised point cloud measurement data.

In an embodiment of the present invention, there is noise in the point cloud data as a result of factors such as instrument accuracy, experience of an operator and mass of the measured object, therefore, it is necessary to reduce noise and by K-d tree algorithm invalid points surrounding a valid point can be minimized to promise calculation accuracy, and as K-d tree algorithm is a kind of conventional algorithm, no detailed explanation will be given to specific K-d tree execution process.

Step S404, compress the denoised point cloud measurement data with a predetermined sharp feature culling algorithm, and generate compressed point cloud data of the ship cabin.

Figure 5:
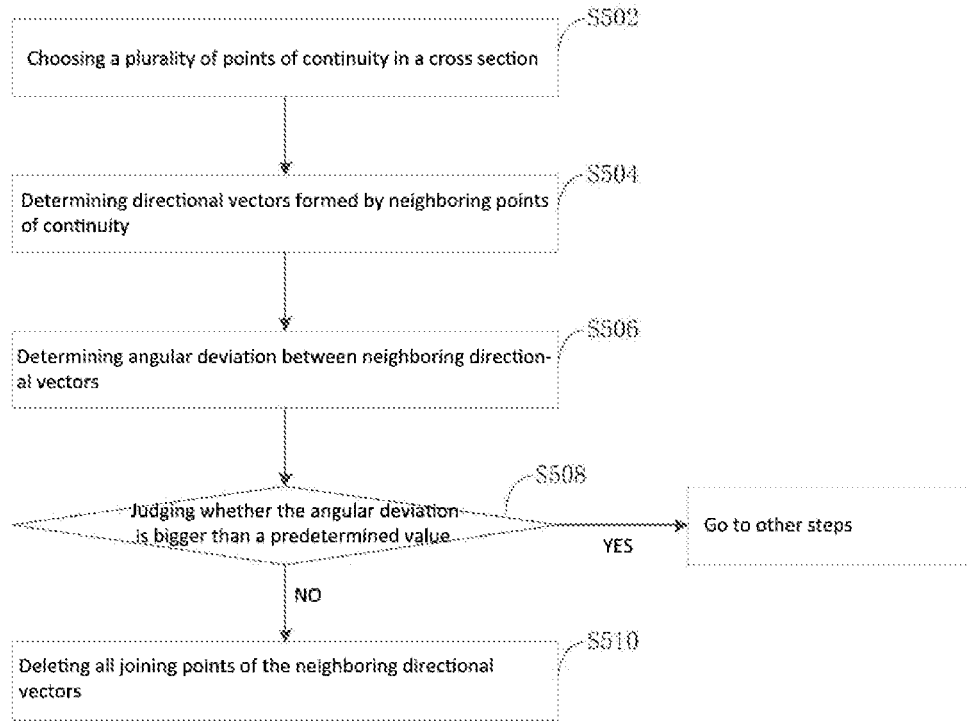
FIG. 5 is a procedural flowchart diagram of point cloud measurement data compression process according to an embodiment of the present invention.

In an embodiment of the present invention, usually the ship cabin is scanned under a medium or high resolution mode, and tens of millions of data points are collected, and calculation speed will be significantly reduced if all of them are to be calculated, therefore, it is necessary to condense the point cloud data to improve calculation efficiency, and the present invention proposed a sharp feature culling algorithm, for which FIG. 5 and an explanation of FIG. 5 can be referred to.

Step S406, modify condensed point cloud data of the ship cabin for longitudinal and transverse inclination with a predetermined longitudinal and transverse inclination modification algorithm, and generate optimized point cloud data of the ship cabin.

In an embodiment of the present invention, as during use, the ship is floating in water and loading capacity of the ship cabins changes as the ship inclines, therefore, it is necessary to give longitudinal and transverse inclination modification, and modify ship inclining status to be floating on even keel. For specific calculation process please refer to FIG. 6 and an explanation thereof.

As is shown in FIG. 5, a procedural flowchart diagram of point cloud measurement data compression according to an embodiment of the present invention, comprising the following steps:

Step S502, determine multiple points of continuity in a cross section.

In an embodiment of the present invention, finding multiple points of continuity in a cross section can be done with the ant colony algorithm mentioned in the following paragraphs, and will not be elaborated on for more details, suppose points of continuity in the cross section is A, B, and C, and for ease of understanding, take point A, B, and C for explanation.

Step S504, determine directional vectors formed by neighboring points of continuity.

In an embodiment of the present invention, calculate directional vectors AB and BC.

Step S506, determine angular deviations between neighboring directional vector.

In an embodiment of the present invention, calculate angular deviation a between directional vector AB and directional vector BC, α<90°.

Step S508, judge whether the angular deviation is bigger than a predetermined threshold. When judging the angular deviation is not bigger than the predetermined threshold, go to step S510; and when judging the angular deviation to be bigger than the predetermined threshold, go to other steps.

In an embodiment of the present invention, assume the predetermined threshold value is β, judge whether the angular deviation α is bigger than the predetermined threshold value β, if not, then the joining point B between the directional vector AB and the directional vector BC are sharp features, and shall be culled, and if so, point B shall be kept.

Step S510, delete all joining points of neighboring directional vectors.

Figure 6:
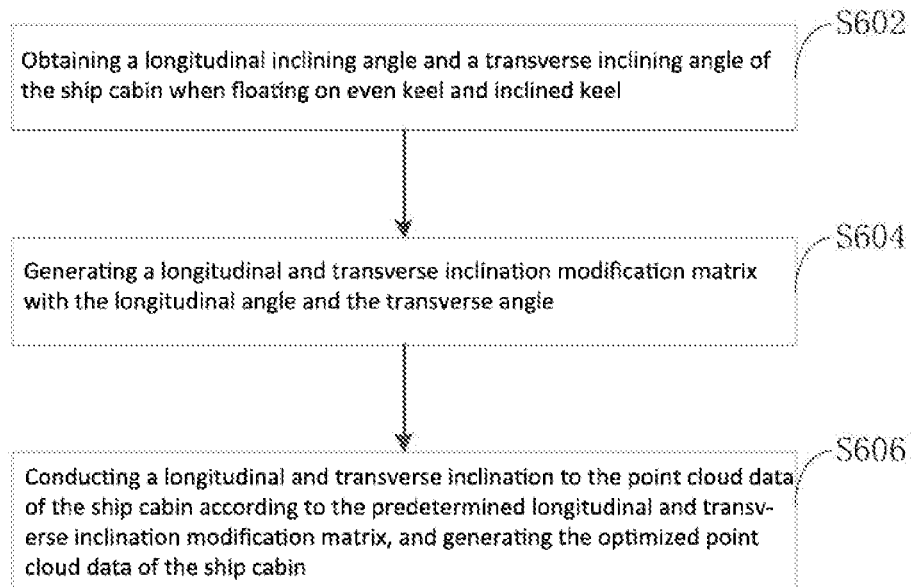
FIG. 6 is a procedural flowchart diagram of point cloud measurement data modification in longitudinal and transverse inclination situations according to an embodiment of the present invention.

As is shown in FIG. 6, a stepwise flowchart diagram of the point cloud measurement data longitudinal and transverse modification process according to an embodiment of the present invention, which comprises following steps:

Step S602, obtain longitudinal inclining angle and transverse inclining angle of the ship cabin when floating on even keel and inclined keel.

In an embodiment of the present invention, coordinate systems of the ship cabin in an even floating status and an inclining floating status are respectively $O_W$-$X_W Y_W Z_W$ and $O_c$-$X_c Y_c Z_c$, then longitudinal inclining angle $\theta_L$ stands for rotation angle against the longitudinal coordinate axis Y, and transverse inclining angle $\theta_c$ stands for rotation angle against the transverse coordinate axis X. Assume coordinate of a point A in the even floating status coordinate system is (x, y, z) and coordinate of the point A in the inclining floating status coordinate system is (x', y', z'), conversion relationship formula between coordinates is:

$$\begin{bmatrix} X \\ Y \\ Z \end{bmatrix} = \lambda R \begin{bmatrix} X' \\ Y' \\ Z' \end{bmatrix}$$

Wherein, γ is a dimension scale factor between two coordinate systems, which is usually set as 1, and R is a longitudinal and transverse inclination modification matrix.

Step S604, generating a longitudinal and transverse inclination modification matrix with the longitudinal angle and the transverse angle.

In an embodiment of the present invention, relationship between the longitudinal and transverse inclination modification matrix, the longitudinal inclining angle $\theta_L$ and the transverse inclining angle $\theta_c$ is:

$$T_{\theta C} = \begin{bmatrix} \cos\theta_C & 0 & -\sin\theta_C \\ 0 & 1 & 0 \\ \sin\theta_C & 0 & \cos\theta_C \end{bmatrix}$$

$$T_{\theta L} = \begin{bmatrix} \cos\theta_L & \sin\theta_L & 0 \\ -\sin\theta_L & \cos\theta_L & 0 \\ 0 & 0 & 1 \end{bmatrix}$$

$$R = T_{\theta C} T_{\theta C} = \begin{bmatrix} \cos\theta_C \cdot \cos\theta_L & \cos\theta_C \cdot \sin\theta_L & -\sin\theta_C \\ -\sin\theta_L & \cos\theta_L & 0 \\ \sin\theta_C \cdot \cos\theta_L & \sin\theta_C \cdot \sin\theta_L & \cos\theta_C \end{bmatrix}$$

Step S606, conduct a longitudinal and transverse inclination to the point cloud data of the ship cabin according to the longitudinal and transverse inclination modification matrix, and generate optimized point cloud data of the ship cabin.

In an embodiment of the present invention, by the longitudinal and transverse modification matrix, it is convenient to convert the ship cabin between even floating status and inclining floating status. Usually, inclining floating status is converted to even floating status to measure real loading capacity of the ship cabin, and during actual loading capacity calculation, the coordinate system of an even floating ship cabin can be reversed to the coordinate system in different longitudinal and transverse inclining status, to correct a loading capacity chart of the ship cabin in different longitudinal and transverse inclinations.

As is shown in FIG. 7, a procedural flowchart diagram of a ship cabin loading capacity measurement method, which comprises the following steps:

Step S702, segment the ship cabin point cloud data into several frustum point cloud datasets according to a predetermined step-length.

In an embodiment of the present invention, a plurality of small frustums are divided by providing a step-length $\Delta z$ along Z axis, and upper surface and lower surface of the frustum are cross section of the ship cabin.

Step S704, sort the frustum point cloud datasets according to ant colony algorithm, and obtain point cloud datasets for the cross sections.

In an embodiment of the present invention, project any of the frustums to a horizontal surface XOY, sort and modify the point cloud data by ant colony algorithm, and get a cross section point cloud aggregate $\{P_i\}$. As the ant colony algorithm is a conventional algorithm, no more detailed explanation will be given to the ant colony algorithm in the present invention.

Step S706, calculate area of the cross section point cloud datasets according to triangle area calculation method based on element differentiation and get area of the cross sections.

In an embodiment of the present invention, divide the cross sections into m rectangular differential elements according to a predetermined step-length $\Delta d$, calculate area of triangular cross sections, add all the differential elements up and get a total cross section area S. That is, calculation formula of the total cross section area S is $$S = \frac{1}{2} \sum_j^m \sum_i^n (x_i \times y_{i+1} - x_{i+1} \times y_i) \Delta d.$$

Step S708, calculate volume of the frustums according to the cross sectional areas and the predetermined step-length.

In an embodiment of the present invention, by integrating along height volume of the frustum can be known, wherein the calculation is done as following:

$$V = \int_0^{Z_k} \frac{1}{2} \sum_j^m \sum_i^n \Delta d(x_i \times y_{i+1} - x_{i+1} \times y_i) dz$$

step S710, summate volumes of the plurality of frustums, and get loading capacity data of the ship cabin.

In an embodiment of the present invention, volume of a frustum is got when multiplying each of the cross sectional area S and the frustum height $\Delta z$, integrate all frustums along the z axis the total volume can be known, which is the loading capacity chart. Wherein, irregular molded lines can be calculated by piecewise conic section fitting, that is, y=f(x), and area of the irregular molded lines can be calculated in the following way: $A_i = \int_0^{Z_k} S_k dz$ (wherein $S_k$ is area beneath liquid height $Z_k$).

Figure 8:
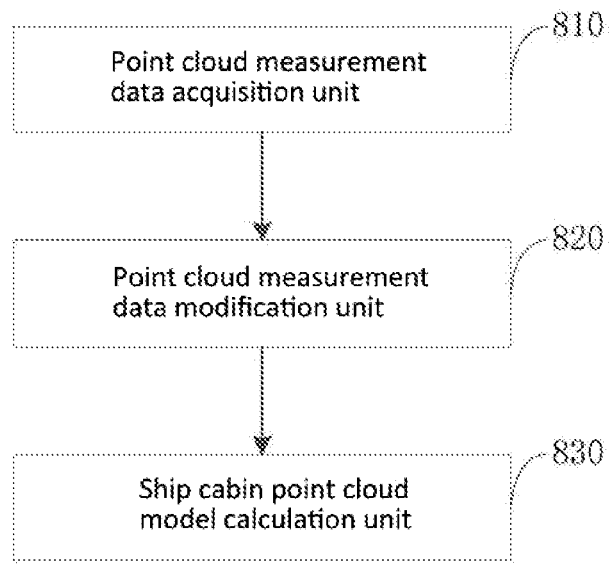
FIG. 8 is a structural diagram of a ship cabin loading capacity measurement apparatus according to an embodiment of the present invention.

As is shown in FIG. 8, a structural diagram of a ship cabin loading capacity measurement device according to an embodiment of the present invention, and please find the following description.

In an embodiment of the present invention, the ship cabin loading capacity measurement device comprises:

A point cloud measurement data acquisition unit 810, for acquiring point cloud measurement data of a ship cabin.

In an embodiment of the present invention, the point cloud measurement data can be acquired directly by three-dimensional lidar equipment, specifically, point cloud data processing rules and loading capacity calculation rules used in subsequent steps can be implemented in a computer device as software, the acquired point cloud measurement data of the ship cabin can be inputted into the computer device by any feasible means such as data line transmission, uploading, downloading and manual input, and the point cloud data processing rules and the loading capacity calculation rules deployed in the computer device will process the point cloud measurement data of the ship cabin directly and generate ship cabin loading capacity data.

A point cloud data modification unit 820, for optimizing the point cloud measurement data according to the predetermined point cloud data processing rules and generating optimized point cloud data of the ship cabin.

In an embodiment of the present invention, optimization of the point cloud data of the ship cabin comprises data denoising and compression. Furthermore, given that a ship is floating in water during use, and in an inclining status, loading capacity of the ship cabin can change, it is usually necessary to conduct longitudinal and transverse inclination modification.

A ship cabin point cloud model calculation unit 830, for calculating the ship cabin point cloud data according to the predetermined loading capacity calculation rules, and getting loading capacity of the ship cabin.

In an embodiment of the present invention, loading capacity of the ship cabin can be obtained after dividing the point cloud data of the ship cabin based on an idea of differential elements, checking areas of each of the cross sections and integrating over height.

According to the ship cabin loading capacity measurement method as provided in embodiments of the present invention, by acquiring point cloud measurement data of a ship cabin, wherein the point cloud measurement data can be acquired by a lidar, and processing the point cloud measurement data of the ship cabin with a predetermined point cloud data processing law and a computation law, and as the point cloud data processing law and the computation law can be deployed in a computer device in advance, after the point cloud measurement data acquisition, loading capacity of a ship cabin can be acquired quickly and precisely, and compared with existing capacity comparison method and geometrical measurement method, the process is simple and the measurement duration is short, with high efficiency and low expenses.

It should be understood that, although steps in flowchart diagrams of the embodiments of the present invention are shown sequentially by arrows, it is not necessary to execute these steps as per the sequence indicated by arrows. Unless expressly indicated otherwise in the present invention, there is no limitation on execution of these steps, which can be carried out in any other orders. Furthermore, at least a part of the steps of the embodiments comprises some sub-steps or multiple stages, it is not necessary to carry out all these sub-steps and stages in one time, which can be done in different times, execution order of these sub-steps and stages are necessarily sequential, It should be understood that, although the steps in the flowcharts of the embodiments of the present invention are displayed in a sequence as indicated by the arrows, these steps are not necessarily executed in sequence in the order indicated by the arrows. Unless specifically stated in this specification, the execution of these steps is not strictly limited in such an order, and these steps can be executed in other orders. Moreover, at least a part of the steps in each embodiment may include multiple sub-steps or multiple stages. These sub-steps or stages are not necessarily executed at the same time, but can be executed at different times. The order of execution of these sub-steps and stages is not necessarily sequential, but may be performed alternately or alternately with other steps or at least a part of sub-steps or stages of other steps.

A person of ordinary skill in the art can understand that all or part of the processes in the above-mentioned embodiments and methods can be implemented by instructing relevant hardware through a computer program. The program can be stored in a non-volatile computer readable storage medium. And when the program is executed, procedures of embodiments of the above-mentioned method may be included. Wherein, any reference to memory, storage, database or other media used in the embodiments provided in this specification may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchlink) DRAM (SLDRAM), memory bus (Rambus) direct RAM (RDRAM), direct memory bus dynamic RAM (DRDRAM), and memory bus dynamic RAM (RDRAM), etc.

Technical features of the above-mentioned embodiments can be combined arbitrarily. In order to make the description concise, all possible combinations of various technical features in the above-mentioned embodiments are not described. However, as long as there is no contradiction in the combination of these technical features, all should be considered falling within scope of this specification.

The foregoing embodiments are only several embodiments of the present invention, and are specifically described to a great detail, but description of the embodiments shall not be construed as limitation on protection scope of the present invention. It shall be pointed out that, for those of ordinary skill in the art, some modifications and improvements can be made without departing from spirit of the present invention, and all of those modifications and improvements fall into protection scope of the present invention. Therefore, protection scope of the present invention is only defined by the appended claims.

The foregoing are only some preferred embodiments of the present invention, which are not intended to limit scope of the present invention, and any modifications, equivalent replacements and improvements fallen within spirits and principles of the present invention shall be covered in protection scope of the present invention.

We claim:

1. A method of automatically measuring a loading capacity of a ship cabin, the method comprising:
   a) floating a ship comprising the ship cabin in water;
   b) receiving, at a processor, a set of three-dimensional (3D) point clouds of a plurality of regions of the ship cabin of the floating ship from a lidar, wherein the set of 3D point clouds of the plurality of regions of the ship cabin includes a first 3D point cloud and a 3D second point cloud;
   c) generating, by the processor, a 3D point cloud of the ship cabin by:

i) applying, by the processor, transformations including rotation and translation to the first 3D point cloud to create a modified first 3D point cloud;
   ii) checking, by the processor, whether the modified first 3D point cloud satisfies a termination condition; and
   iii) if not, turning to step i) to apply transformations including rotation and translation to the modified first 3D point cloud; and if yes, aligning and registering the modified first 3D point cloud and the second 3D point cloud to create the 3D point cloud of the ship cabin;
   d) de-noising, by the processor, the 3D point cloud of the ship cabin with a K-dimensional tree algorithm to create a de-noised 3D point cloud of the ship cabin;
   e) compressing, by the processor, the de-noised 3D point cloud of the ship cabin with a predetermined sharp feature culling algorithm to create a compressed 3D point cloud of the ship cabin;
   f) modifying, by the processor, the compressed 3D point cloud of the ship cabin for longitudinal and transverse inclinations, and generating a modified 3D point cloud of the ship cabin;
   wherein step f) comprises:
   obtaining a longitudinal inclining angle and a transverse inclining angle of the ship cabin when the ship cabin is floating on an even keel and an inclined keel, respectively;
   generating modification matrices according to the longitudinal inclining angle and the transverse inclining angle of the ship cabin; and
   modifying the compressed 3D point cloud of the ship cabin for longitudinal and transverse inclinations according to the modification matrices;
   g) extracting, by the processor, a plurality of 3D frustums from the modified 3D point cloud of the ship cabin according to a predetermined step-length; and
   h) automatically generating, by the processor, a measurement result for the loading capacity of the ship cabin based on the plurality of 3D frustums.

2. The method of claim 1, wherein step e) comprises:
selecting a plurality of continuous points in a cross section of the 3D point cloud of the ship cabin;
determining neighboring directional vectors formed by neighboring continuous points;
determining an angular deviation between the neighboring directional vectors;
determining whether the angular deviation is larger than a predetermined threshold; and
deleting all joining points of the neighboring directional vectors when the angular deviation is not larger than the predetermined threshold.

3. The method of claim 1, wherein step h) comprises:
sorting the plurality of 3D frustums according to an ant colony algorithm to obtain a set of cross section data;
obtaining areas of the set of cross section data according to a triangle area calculation method;
obtaining volumes of the plurality of 3D frustums based on the areas of the cross section data and the predetermined step-length; and
generating the measurement result for the loading capacity of the ship cabin based on a sum of the volumes of the plurality of 3D frustums.

* * * * *